(12) United States Patent
Tang et al.

(10) Patent No.: US 11,609,012 B2
(45) Date of Patent: Mar. 21, 2023

(54) COMMUNICATION IMPLEMENTATION METHOD AND DEVICE FOR AIR CONDITIONING UNITS, NON-TRANSITORY COMPUTER READABLE STORAGE MEDIUM AND PROCESSOR

(71) Applicant: Gree Electric Appliances, Inc. of Zhuhai, Guangdong (CN)

(72) Inventors: Jie Tang, Guangdong (CN); Tieying Ye, Guangdong (CN); Weiyou Yu, Guangdong (CN); Wencan Wang, Guangdong (CN); Zhongwen Deng, Guangdong (CN); Quanzhou Liu, Guangdong (CN); Qiang Huang, Guangdong (CN); Du Yang, Guangdong (CN); Zhongzheng Li, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 270 days.

(21) Appl. No.: 16/976,994

(22) PCT Filed: Dec. 14, 2018

(86) PCT No.: PCT/CN2018/121133
§ 371 (c)(1),
(2) Date: Aug. 31, 2020

(87) PCT Pub. No.: WO2019/165825
PCT Pub. Date: Sep. 6, 2019

(65) Prior Publication Data
US 2021/0003307 A1    Jan. 7, 2021

(30) Foreign Application Priority Data
Mar. 2, 2018   (CN) .......................... 201810176093.1

(51) Int. Cl.
F24F 11/46   (2018.01)
F24F 11/89   (2018.01)
(Continued)

(52) U.S. Cl.
CPC .............. *F24F 11/46* (2018.01); *F24F 11/56* (2018.01); *F24F 11/89* (2018.01); *F24F 2140/60* (2018.01)

(58) Field of Classification Search
CPC .. F24F 11/46; F24F 11/56; F24F 11/89; F24F 2140/60; F24F 11/61; F24F 11/64; H04B 2203/5458; H04B 2203/5466; H04B 3/54
See application file for complete search history.

(56) References Cited

U.S. PATENT DOCUMENTS 6,510,189 B1   1/2003   Hiramatsu et al.
8,549,340 B2   10/2013  Hua et al.
(Continued)

FOREIGN PATENT DOCUMENTS

CN         1239632 A      12/1999
CN       101754228 A      6/2010
(Continued)

*Primary Examiner* — Charles R Kasenge
(74) *Attorney, Agent, or Firm* — The Webb Law Firm

(57) ABSTRACT

This disclosure discloses a communication implementation method and device for air conditioning units, a storage medium and a processor. The method includes: acquiring a channel state of a current power line carrier channel used between units in an air conditioning system; and determining whether to switch the channel between the units from the current power carrier channel to a next power carrier channel according to the channel state, wherein the next power carrier channel is any one of power carrier channels other than the current power carrier channel in the air conditioning system.

19 Claims, 7 Drawing Sheets

(51) Int. Cl.
*F24F 11/56* (2018.01)
*F24F 140/60* (2018.01)

(56) References Cited

U.S. PATENT DOCUMENTS

| | | | |
|---|---|---|---|
| 2001/0008391 A1 | 7/2001 | Yuasa | |
| 2005/0005619 A1 | 1/2005 | Kojima et al. | |
| 2011/0140911 A1* | 6/2011 | Pant ........................ | H04B 3/58 |
| | | | 340/12.34 |

FOREIGN PATENT DOCUMENTS

| | | | |
|---|---|---|---|
| CN | 102592431 | A | 7/2012 |
| CN | 102710293 | A | 10/2012 |
| CN | 103138801 | A | 6/2013 |
| CN | 203870783 | U | 10/2014 |
| CN | 104253631 | A | 12/2014 |
| CN | 104753567 | A | 7/2015 |
| CN | 106160789 | A | 11/2016 |
| CN | 106225181 | A | 12/2016 |
| CN | 108731193 | A | 11/2018 |
| JP | S60218960 | A | 11/1985 |

* cited by examiner

US 11,609,012 B2

COMMUNICATION IMPLEMENTATION METHOD AND DEVICE FOR AIR CONDITIONING UNITS, NON-TRANSITORY COMPUTER READABLE STORAGE MEDIUM AND PROCESSOR

CROSS-REFERENCE TO RELATED APPLICATIONS

This application is the United States national phase of International Application No. PCT/CN2018/121133 filed Dec. 14, 2018, and claims priority to Chinese Patent Application No. 201810176093.1 filed Mar. 2, 2018, the disclosures of which are hereby incorporated by reference in their entirety.

BACKGROUND OF THE INVENTION

Field of the Invention

The disclosure relates to the field of air conditioners, in particular to a communication implementation method and device for air conditioning units, a non-transitory computer readable storage medium and a processor.

Description of Related Art

The current communication network adopted by multi-split air conditioning units is formed by connecting multi-split air conditioning units with communication lines. Since a multi-split air conditioning unit system has the characteristics of having a large number of air conditioners, and installation positions are either dispersed or concealed and the like.

SUMMARY OF THE INVENTION

According to one aspect of the embodiments of the disclosure, a communication implementation method of an air conditioning unit is provided, which comprises: acquiring the channel state of a current power line carrier channel used between units in an air conditioning system; determining whether to switch the channel between the units from the current power line carrier channel to a next power line carrier channel according to the channel state, wherein the next power line carrier channel is any power line carrier channel except the current power line carrier channel in the air conditioning system.

In some embodiments, the acquiring a channel state of a current power line carrier channel between units in an air conditioning system comprises: acquiring a signal parameter for reflecting channel quality of the current power line carrier channel of the current power line carrier channel; and, the determining whether to switch the current power line carrier channel between the units to a next power line carrier channel according to the channel state comprises: comparing the signal parameter with a preset threshold value; and, determining whether to switch the current power line carrier channel between the units to the next power line carrier channel according to a result of comparison.

In some embodiments, the determining whether to switch the current power line carrier channel between the units to the next power line carrier channel according to a result of the comparison comprises: determining the current power line carrier channel as an unavailable channel and triggering to switch the current power line carrier channel between the units to the next power line carrier channel when the signal parameter is less than the preset threshold value; and, determining the current power line carrier channel as an available channel and refusing to switch the current power line carrier channel between the units to the next power line carrier channel when the signal parameter is greater than the preset threshold value.

In some embodiments, the next power line carrier channel is determined by: determining a power supply type of the units, wherein the power supply type comprises a multi-phase power supply and a single-phase power supply; determining a set of power line carrier channels in the air conditioning system according to the power supply type; and, selecting the next power line carrier channel from the set of power line carrier channels.

In some embodiments, the determining a set of power line carrier channels in the air conditioning system according to the power supply type comprises: determining each of elements in the set of power line carrier channels according to a combination of any two of a live wire, a zero wire and a first designated line connected with the units when the power supply type is the single-phase power supply, wherein the first designated line is any communication passage except the live wire and the zero wire between the units of the air conditioning system; determining each of the elements in the set of power line carrier channels according to a combination of any two of a plurality of live wires, a zero wire and a second designated line in the multi-phase power supply connected with the units when the power supply type is the multi-phase power supply, wherein the second designated line is any communication passage except the live wires and the zero wire between the units of the air conditioning system.

In some embodiments, at least one of the first designated line or the second designated line is: a refrigerant pipe or a ground wire used for connecting different units in the air conditioning system.

In some embodiments, the power type is determined to be the single-phase power supply if: the power supply connected with the units is the single-phase power supply; or, the power supply connected with the units is the three-phase power supply, and the units only support the single-phase power supply.

In some embodiments, the method further comprises: detecting a transmission time length which is a time length from a starting time that the current power line carrier channel starts to transmit a signal to a current time of the current power line carrier channel; and, triggering the switching the current power line carrier channel between the units to the next power line carrier channel when the transmission time length is greater than a preset time length.

According to another aspect of the embodiments of the present disclosure, there is provided a communication implementation device of air conditioning units, comprising: an acquisition module configured to acquire a signal parameter of a current power line carrier channel between units in an air conditioning system, wherein the signal parameter is used for reflecting quality of the current power line carrier channel; a comparison module configured to compare the signal parameter with a preset threshold value; and, a first determining module configured to determine whether the current power line carrier channel is an available channel or not according to the comparing result.

According to another aspect of the embodiments of the disclosure, a non-transitory computer readable storage medium is provided, the storage medium comprising a stored program which, when executed, controls a device where the storage medium is located to execute any of the aforementioned communication implementation methods of air conditioning units.

According to another aspect of the embodiments of the present disclosure, a processor for running a program is provided, wherein the program is run to perform the communication implementation method for performing instructions comprising: acquiring a channel state of a current power line carrier channel between units in an air conditioning system; determining whether to switch the current power line carrier channel between the units to a next power line carrier channel which is any power line carrier channel except the current power line carrier channel in the air conditioning system according to the channel state.

According to another aspect of the embodiments of the present disclosure, there is provided an air conditioning system, comprising: an outdoor unit, an indoor unit and a controller; wherein the outdoor unit comprises the aforementioned processor.

In some embodiments, the acquiring a channel state of a current power line carrier channel between units in an air conditioning system comprises: acquiring a signal parameter for reflecting channel quality of the current power line carrier channel of the current power line carrier channel; and the determining whether to switch the current power line carrier channel between the units to a next power line carrier channel according to the channel state comprises: comparing the signal parameter with a preset threshold value; and determining whether to switch the current power line carrier channel between the units to the next power line carrier channel according to a result of the comparison.

In some embodiments, the determining whether to switch the current power line carrier channel between the units to the next power line carrier channel according to a result of the comparison comprises: determining the current power line carrier channel as an unavailable channel and triggering to switch the current power line carrier channel between the units to the next power line carrier channel when the signal parameter is less than the preset threshold value; and determining the current power line carrier channel as an available channel and refusing to switch the current power line carrier channel between the units to the next power line carrier channel when the signal parameter is greater than the preset threshold value.

In some embodiments, the next power line carrier channel is determined by: determining a power supply type of the units, wherein the power supply type comprises a multi-phase power supply and a single-phase power supply; determining a set of power line carrier channels in the air conditioning system according to the power supply type; and selecting the next power line carrier channel from the set of power line carrier channels.

In some embodiments, the determining a set of power line carrier channels in the air conditioning system according to the power supply type comprises: determining each of elements in the set of power line carrier channels according to a combination of any two of a live wire, a zero wire and a first designated line connected with the units when the power supply type is the single-phase power supply, wherein the first designated line is any communication passage except the live wire and the zero wire between the units of the air conditioning system; determining each of the elements in the set of power line carrier channels according to a combination of any two of a plurality of live wires, a zero wire and a second designated line in the multi-phase power supply connected with the units when the power supply type is the multi-phase power supply, wherein the second designated line is any communication passage except the live wires and the zero wire between the units of the air conditioning system.

In some embodiments, at least one of the first designated line or the second designated line is: a refrigerant pipe or a ground wire used for connecting different units in the air conditioning system.

In some embodiments, the power type is determined to be the single-phase power supply if: the power supply connected with the units is the single-phase power supply; or the power supply connected with the units is the three-phase power supply, and the units only support the single-phase power supply.

In some embodiments, the instructions further comprise: detecting a transmission time length which is a time length from a starting time that the current power line carrier channel starts to transmit a signal to a current time of the current power line carrier channel; and triggering the switching the current power line carrier channel between the units to the next power line carrier channel when the transmission time length is greater than a preset time length.

In some embodiments, the controller comprises: at least one temperature controller and an integrated controller.

BRIEF DESCRIPTION OF THE DRAWINGS

The drawings described herein are used to provide a further understanding of the present disclosure and form a part of the present disclosure. The schematic embodiments of the present disclosure and their descriptions are used to explain the present disclosure and do not constitute an undue limitation on the present disclosure. In the drawings.

DESCRIPTION OF THE INVENTION

Figure 1:
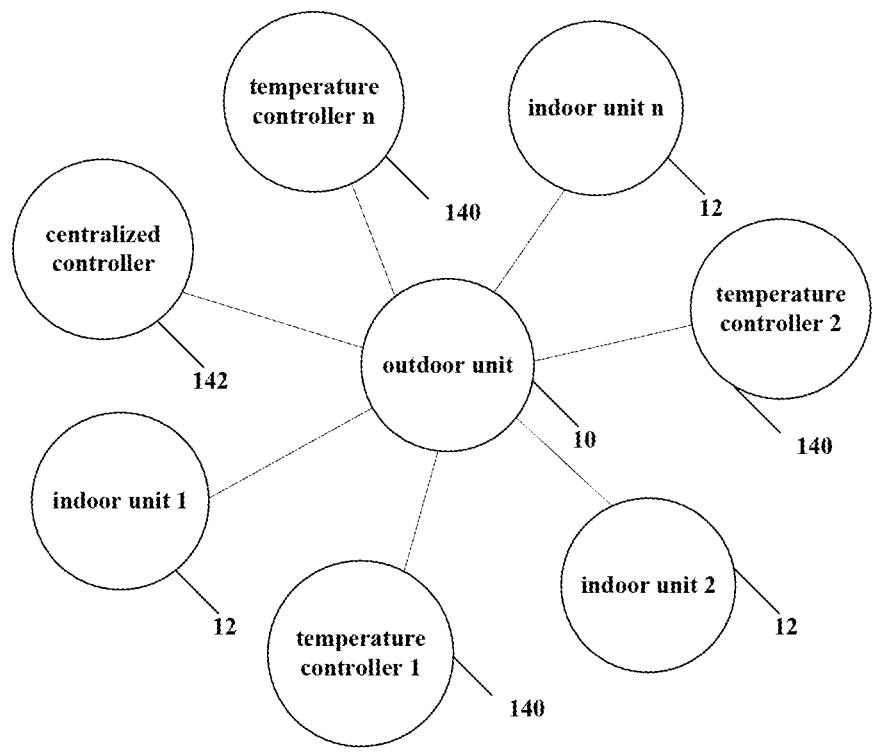
FIG. 1 is a schematic structural view of a multi-split air conditioning system according to some embodiments of the present disclosure.

In order to make those skilled in the art better understand the technical solutions of the present disclosure, the technical solutions in the embodiments of the present disclosure will be clearly and completely described below with reference to the drawings in the embodiments of the present disclosure, and it is obvious that the described embodiments are only a part, instead of all, of the embodiments of the present disclosure. All other embodiments, which can be obtained by a person skilled in the art without making any creative effort based on the embodiments in the present disclosure, shall fall within the protection scope of the present disclosure.

It should be noted that the terms "first," "second," and the like in the description and claims of the present disclosure and in the drawings described above are used for distinguishing between similar elements and not necessarily for describing a particular sequential or chronological order. It is to be understood that the data so used is interchangeable under appropriate circumstances such that the embodiments of the disclosure described herein are capable of operation in other sequences than those illustrated or described herein. Moreover, the terms "comprising", "having", and any variations thereof, are intended to cover a non-exclusive inclusion, such that a process, method, system, product, or device that comprises a list of steps or elements is not necessarily limited to those steps or elements expressly listed, but may include other steps or elements not expressly listed or inherent to such process, method, article, or device.

The embodiments of the disclosure provides a communication implementation method and device of air conditioning units, a storage medium and a processor, which at least solve the technical problems of high engineering installation cost and difficulty, poor communication line contact, and difficulty in troubleshooting in the related technology.

For a better understanding of the examples of the present disclosure, the terms referred to in the embodiments of the present disclosure are briefly described below.

The single-phase power supply refers to the traction power supply mode where the phase of voltage of the section supplied by different substations on the line is the same and there is no electrical phase separation on the line.

The multi-phase power supply: a plurality of single-phase power supply loops are combined together to form the multi-phase power supply. The concept of multi-phase is different from the concept of multipath. Phase, i.e., phase of the PWM (Pulse Width Modulation) signal wave. The multi-phase power supply not only simply connect elements in parallel, but also staggers their working time on the basis of parallel connection.

The power Line communication: PLC is short for power Line communication. Power line carrier is a communication method specific to a power system, and the power line communication is a technology for transmitting an analog or digital signal in form of carrier at a high speed using an existing power line. The most prominent characteristic is that the data transmission can be carried out without re-erecting the network as long as the electric wire is available.

A channel for transmitting information by using the technology of power line communication is called a power line carrier channel.

In the related art, a communication network adopted by multi-split air conditioning units is formed by connecting various multi-connected air conditioning units with communication lines, but this mode has the defects of high engineering installation cost and difficulty, poor communication line contact, and difficulty in troubleshooting. The inventors find that power is supplied in the air conditioning system through the power line, so that by using power line as a transmission medium of the technology of power line communication, the engineering installation of a communication line can be omitted, and the phenomenon of poor communication contact is greatly reduced. Meanwhile, since modulated data signals are transmitted on a medium in form of differential signals in the technology of power line communication, two independent conductors are needed for transmitting the differential signals, and alive wire and a zero wire of a power supply can be selected as the transmission medium of the differential signals. However, the situation that devices may be connected with different live wires possibly exists under a three-phase power supply. The embodiments of the present disclosure also provide a switching mechanism of power line communication channel based on a multi-split air conditioning system to solve the communication problem of different power supplies for internal and external machines. In order to achieve the above purpose, the embodiments of the present disclosure adopt corresponding solutions, which are described in detail below.

According to some embodiments of the present disclosure, the embodiments of a communication implementation method of air conditioning units is provided, where it is to be noted that the steps illustrated in the flowchart of the accompanying drawings may be executed in a computer system, such as a computer system storing a set of computer executable instructions. Moreover, although a logical order is illustrated in the flowchart, in some cases, the steps illustrated or described may be executed in an order different from that shown in the figure.

FIG. 1 is a schematic structural diagram of an air conditioning system according to some embodiments of the present disclosure. As shown in FIG. 1, devices of the multi-split air conditioning system, including but not limited to an outdoor unit 10, at least one indoor unit 12 and related controllers, use a power line carrier channel for communication, and no dedicated communication line is required for connection, wherein the controllers include but are not limited to: a temperature controller 140 and a centralized controller 142. The devices in the system can monitor the signal quality and dynamically switch communication channels.

In the multi-split air conditioning system, an external unit serves as a network coordinator and is responsible for initiating and maintaining a network, and needs to have the following functions at the same time.

The signal monitoring: the quality of a power line carrier signal can be monitored and the signal strength and the signal legitimacy can be determined through signal monitoring.

The channel coupling: through the signal coupling, the power line carrier signals can be coupled to different transmission media and dynamically switched between different channels.

The communication function: in charge of processing of communication data.

Other nodes other than the outdoor unit, including but not limited to the indoor unit, as sites of the network also have the above functions. Therefore, signal quality judgment and channel dynamic switching are carried out based on signal monitoring and channel coupling technology to realize automatic switching of the signals on different channels to avoid transmission of signal in useless channels and reducing of the transmitting power.

It should be noted that the following functions may be implemented by different functional modules, including but not limited to hardware and software modules.

Figure 2:
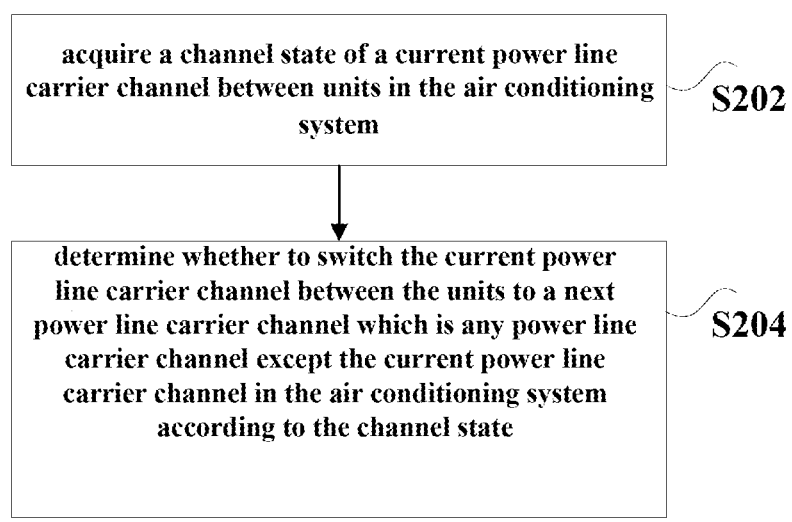
FIG. 2 is a flowchart of a communication implementation method of air conditioning units according to some embodiments of the disclosure.

FIG. 2 is a flowchart of a communication implementation method of air conditioning units according to some embodiments of the present disclosure, and the method shown in FIG. 2 may be applied to the structure shown in FIG. 1. As shown in FIG. 2, the method comprises the following steps.

At step S202, a channel state of a current power line carrier channel between units in the air conditioning system is acquired.

At step S204, whether to switch the current power line carrier channel between the units to a next power line carrier channel which is any power line carrier channel except the current power line carrier channel in the air conditioning system is determined according to the channel state.

Figure 9:
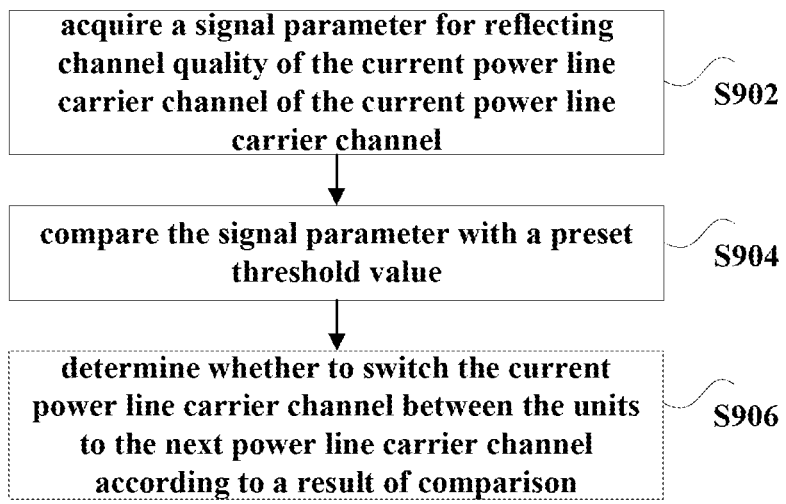
FIG. 9 is a flowchart of a communication implementation method of air conditioning units according to some other embodiments of the present disclosure.

FIG. 9 is a flowchart of a communication implementation method of air conditioning units according to some other embodiments of the present disclosure. As shown in FIG. 9, the method comprises steps S902 to S904: step S902, acquiring a signal parameter for reflecting channel quality of the current power line carrier channel of the current power line carrier channel; step S904, comparing the signal parameter with a preset threshold value; and step S906, determining whether to switch the current power line carrier channel between the units to the next power line carrier channel according to a result of comparison.

In some embodiments, step S204 may be expressed as the following implementation: determining the current power line carrier channel as an unavailable channel and triggering to switch the current power line carrier channel between the units to the next power line carrier channel when the signal parameter is less than the preset threshold value; and, determining the current power line carrier channel as an available channel and refusing to switch the current power line carrier channel between the units to the next power line carrier channel when the signal parameter is greater than the preset threshold value. The meaning of the available channel is a channel which can be used for transmitting data to be transmitted under a certain condition (for example, the signal quality meets a preset condition).

In some embodiments, the signal parameter may be represented by a signal strength, or an indicator such as a signal-to-noise ratio, or the like, and is not limited thereto. The air conditioning system includes, but is not limited to, a multi-split system. The preset threshold may be a threshold set empirically or may be a threshold determined through a machine learning method, and is not limited to this.

Figure 10:
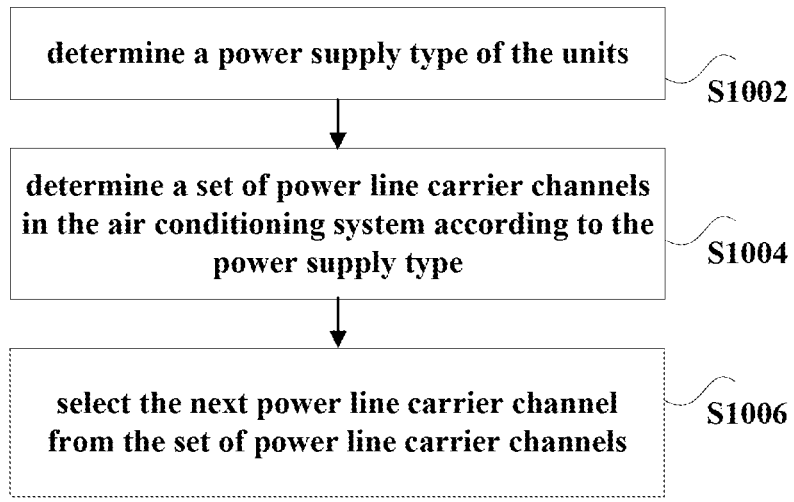
FIG. 10 is a flowchart of a determining method of the next power line carrier channel according to some embodiments of the present disclosure.

In the related art, the power supply lines use a three-phase power supply or a single-phase power supply, and the air conditioning unit is divided into a single-phase power supply and a three-phase power supply, so that the situation that the air conditioning unit is connected to different phase power supplies may occur easily, so it is necessary to solve the problem of the difference in phases of power supply. In order to solve the problem, embodiments of the present disclosure provide a channel automatic adaptation mechanism for power line carrier communication in different power supplies, so as to implement signal monitoring according to connection conditions of different devices in an air conditioning system and automatically select different channels, thereby ensuring reliable communication between nodes of the air conditioning system. Specifically, prior to switching the current power line carrier channel between the units to the next power line carrier channel, the following processing procedures may be further performed, but are not limited to this. FIG. 10 is a flowchart of a determining method of the next power line carrier channel according to some embodiments of the present disclosure. As shown in FIG. 10, the method comprises steps S1002 to S1006: step S1002, determining a power supply type of the units, wherein the power supply type comprises a multi-phase power supply and a single-phase power supply; step S1004, determining a set of power line carrier channels in the air conditioning system according to the power supply type; and step S1006, selecting the next power line carrier channel from the set of power line carrier channels.

The set of power line carrier channels may be determined by, but is not limited to, the following manners: determining each of elements in the set of power line carrier channels according to a combination of any two of a live wire, a zero wire and a first designated line connected with the units when the power supply type is the single-phase power supply, wherein the first designated line is any communication passage except the live wire and the zero wire between the units of the air conditioning system; determining each of the elements in the set of power line carrier channels according to a combination of any two of a plurality of live wires, a zero wire and a second designated line in the multi-phase power supply connected with the units when the power supply type is the multi-phase power supply, wherein the second designated line is any communication passage except the live wires and the zero wire between the units of the air conditioning system.

Figure 3A:
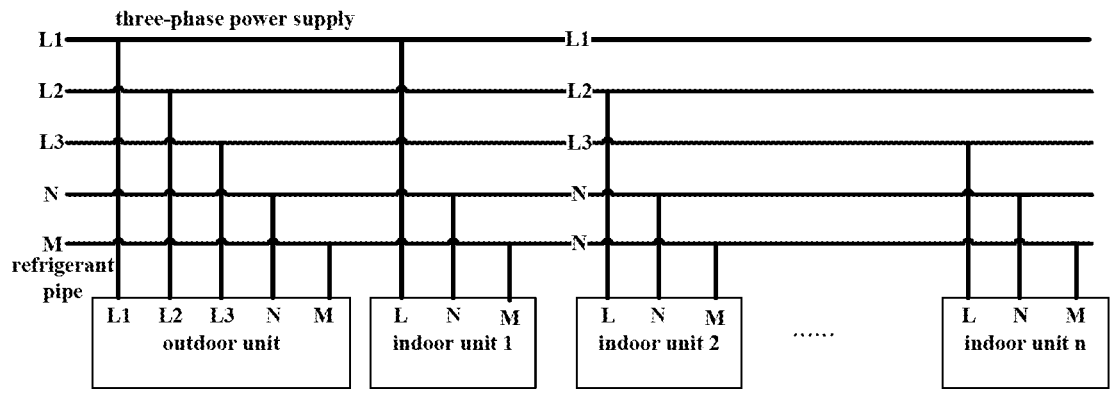
FIG. 3a is a schematic diagram of an optional three-phase power system communication network in accordance with some embodiments of the present disclosure.

Taking the three-phase power supply as an example, as shown in FIG. 3a, under the three-phase power supply, the devices in the multi-split air conditioning system may automatically monitor the channel quality and perform dynamic switching between L1/L2/L3/N/M (refrigerant pipe). It should be noted that since the signals transmitted in the air conditioning system are differential signals, the channel herein refers to a combination of any two channels between L1, L2, L3, N, and M (refrigerant pipe), wherein, L1\ L2\ L3 is a live wire, and N is a zero wire.

Figure 3B:
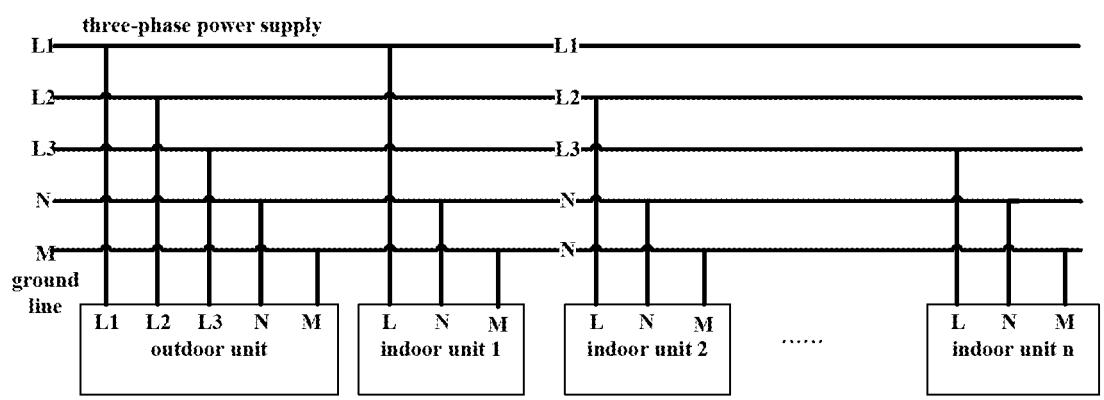
FIG. 3b is a schematic diagram of another alternative three-phase power system communication network in accordance with some embodiments of the present disclosure.

For another example, as shown in FIG. 3b, under the three-phase power supply, the devices in the multi-split air conditioning system may automatically monitor the channel quality and perform dynamic switching between L1/L2/L3/N/M (ground line). It should be noted that since the signals transmitted in the air conditioning system are differential signals, the channel herein refers to a combination of any two channels of L1, L2, L3, N, and M (ground line), wherein L1\ L2\ L3 is a live wire, and N is a zero wire.

Figure 4A:
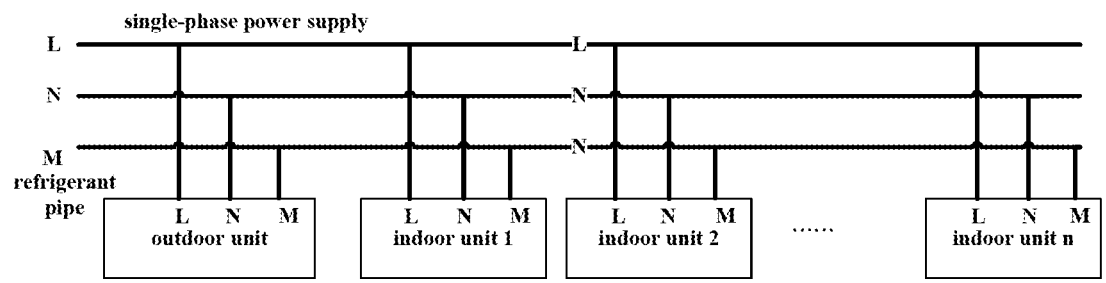
FIG. 4a is a schematic diagram of an alternative single-phase power system communication network according to some embodiments of the present disclosure.

As shown in FIG. 4a, under the single-phase power supply, the devices in the multi-split air conditioning system may automatically monitor the channel quality and perform dynamic switching among L/N/M (refrigerant pipe), wherein, L is a live wire and N is a zero wire.

Figure 4B:
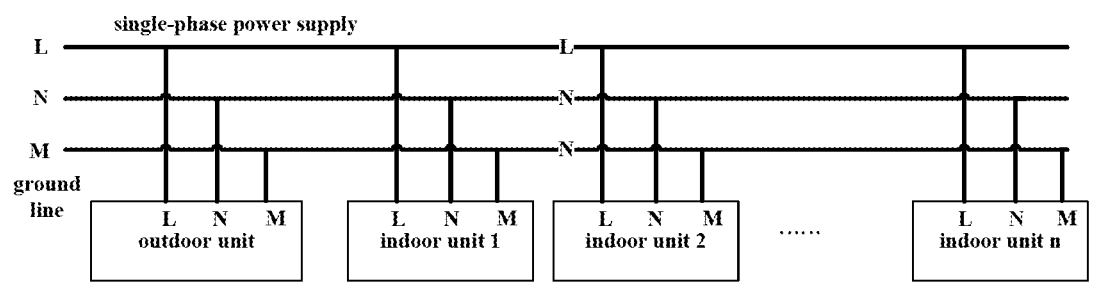
FIG. 4b is a schematic diagram of another alternative single-phase power system communication network according to some embodiments of the present disclosure.

For another example, as shown in FIG. 4b, under the single-phase power supply, the devices in the multi-split air conditioning system may automatically monitor the channel quality and perform dynamic switching among L/N/M (ground line), wherein L is a live wire and N is a zero wire.

In some alternative embodiments, at least one of the first designated line or the second designated line include channels newly added in the air conditioning system and used for the inter-unit communication, and may also include the channels existing in the air conditioning system, such as the refrigerant pipe in the air conditioning system. In some other alternative embodiments, the existing channels may include, but are not limited to: the ground wire used for connecting different units, which can be a newly added ground wire in the system or an existing independent ground wire in the system.

In some other alternative embodiments, the determination of the power type as single phase power supply is made when: the power supply connected with the units is the single-phase power supply; or the power supply connected with the units is the three-phase power supply and the units only support the single-phase power supply.

Figure 11:
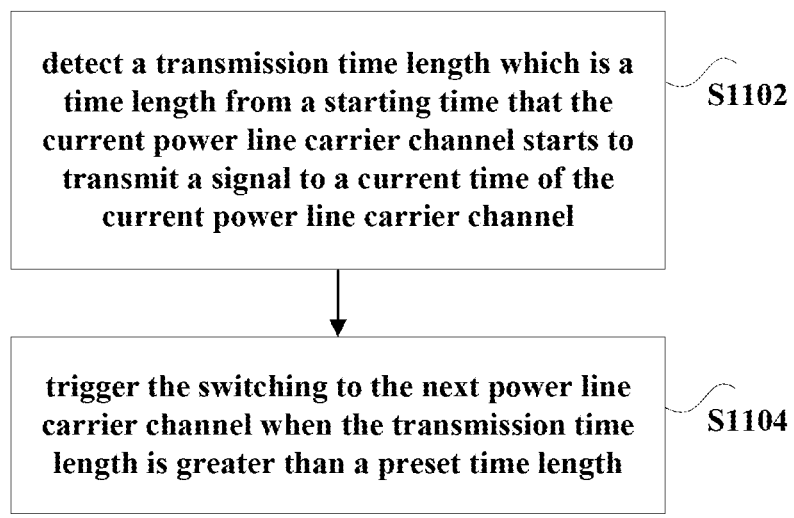
FIG. 11 is a flow chart of an switching triggering method according to some embodiments of the present disclosure.

In some embodiments, prior to switching the current power line carrier channel between the units to the next power line carrier channel, the method further comprises other steps. FIG. 11 is a flow chart of an switching triggering method according to some embodiments of the present disclosure. As shown in FIG. 11, the method comprises steps S1102 to S1104:

Step S1102: detecting a transmission time length which is a time length from a starting time that the current power line carrier channel starts to transmit a signal to a current time of the current power line carrier channel; step S1104: triggering the switching to the next power line carrier channel when the transmission time length is greater than a preset time length. The preset time length can be flexibly set according to actual conditions. For example, the preset time can be set to be 1 m, 2 s, etc. In order to prevent excessive frequent switching, the switching process may be triggered when the duration under the following conditions is greater than a preset value: the channel quality is below a preset threshold.

Figure 5:
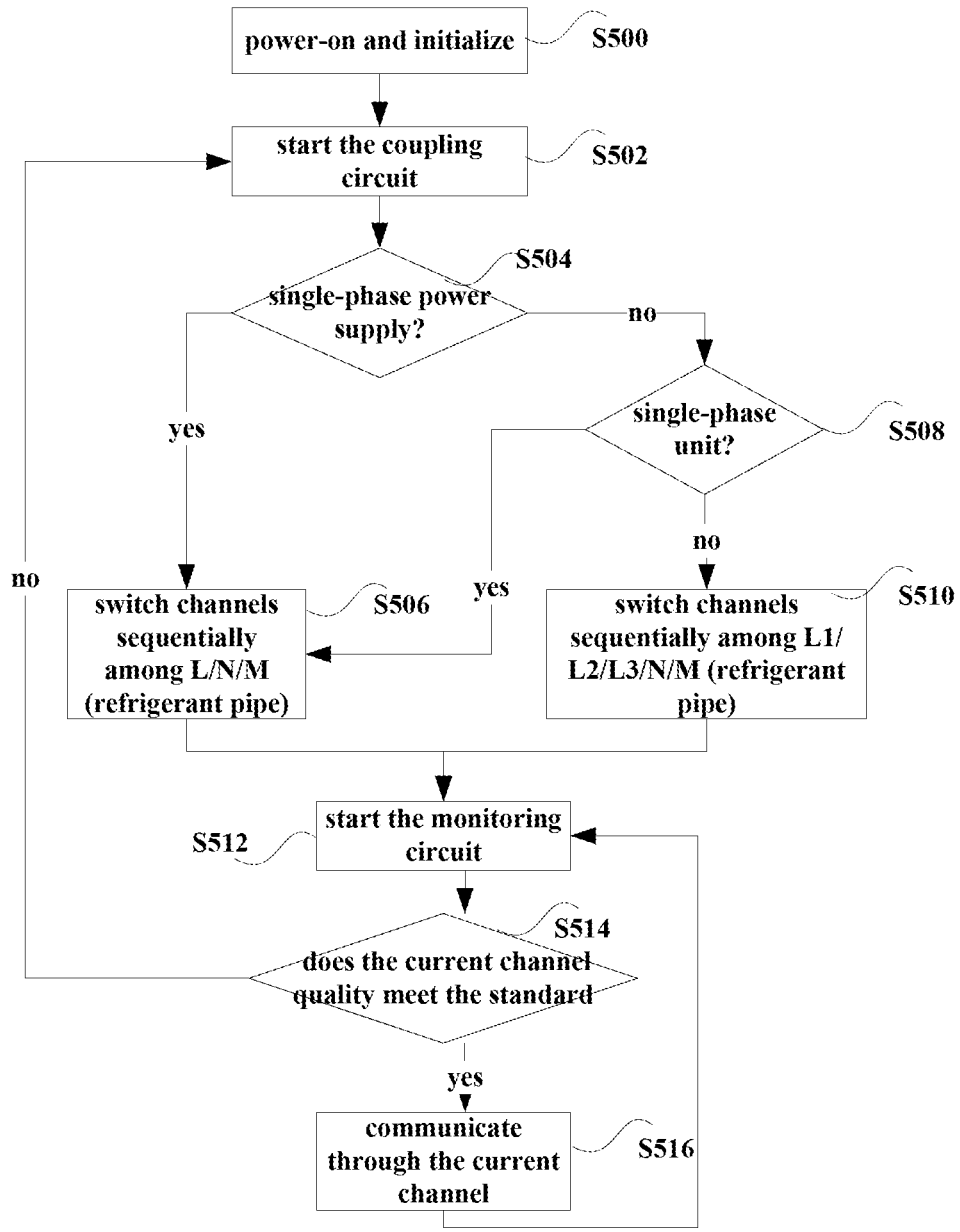
FIG. 5 is a flow chart of an alternative communication method based on power line carrier channel according to some embodiments of the present disclosure.

FIG. 5 is a flow chart of an alternative power line carrier channel based communication method according to some embodiments of the present disclosure. As shown in FIG. 5, the method comprises the following processing steps.

At step S500, the units are powered on and initialed. And after the units are powered on, the coupling delay time T is initialized as T=Ts.

At step S502, the coupling circuit is started. The coupling circuit is started to get ready for coupling a signal onto the power line.

At step S504, whether the power supply is a single-phase power supply is determined. Step S506 is executed if the power supply is a single-phase power supply; if not, step S508 is executed.

At step S506, channels are sequentially switched among the L/N/M (refrigerant pipe). The channels are switched by the coupling circuit sequentially among the L/N/M (refrigerant pipe) as shown in FIGS. 4a and 4b, and then step S512 is performed.

At step S508, whether the units are single-phase units is judged. If the units are single-phase units under a three-phase power supply, step S506 is executed; if the units are not single-phase units under the three-phase power supply, but three-phase units under the three-phase power supply, step S510 is executed.

At Step S510, channels are switched sequentially among L1/L2/L3/N/M (refrigerant pipe). If the power supply is a three-phase power supply and the units use three-phase power supply, the coupling circuit sequentially switches channels among L1/L2/L3/N/M (refrigerant pipe) when the coupling circuit is at the delay time T=Ts, as shown in FIGS. 3a and 3b, and then step S512 is executed.

At step S512, a monitoring circuit is started. After the signal coupling is completed, for example, the current coupled channel comprises L and N, and the time T is cleared, at this moment, the monitoring circuit is started to monitor the signal quality under the current channel in real time, and the current signal quality P is obtained.

At step S514, whether the quality of the current channel signal meets the standard is determined. If the current signal quality P is greater than or equal to Ps (a set reliable communication value), the signal is considered to meet the standard, and step S516 is executed; if the current signal quality P is less than Ps, the signal is considered not to meet the standard, which may be because the devices do not use a same power supply or the communication quality under the channels is poor, then T=Ts is initialized, and step S502 is repeated.

At step S516, communication is performed under the current channel. At this moment, communication can be performed under the current channel, and the value P under the channel is monitored in real time, and then step S512 is executed.

Through the above-mentioned steps, the dynamic signal quality monitoring and the dynamic channel switching of the full channel of the multi-split air conditioning system using the power line can be realized, while ensuring the reliability of units communication, so that the communication between units can be realized through the power line carrier channel, thereby solving the technical problems of high engineering installation cost, the poor contact of the communication line and the difficulty of troubleshooting, etc. caused by the fact that the air conditioning units are connected through communication lines in the related technology.

Figure 6:
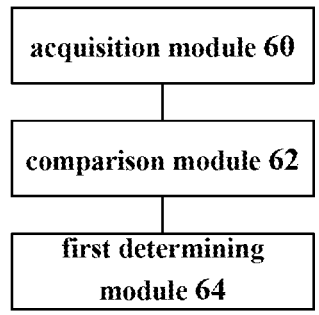
FIG. 6 is a structural block diagram of a communication implementation device of air conditioning units according to some embodiments of the present disclosure.

FIG. 6 is a structural block diagram of a communication implementation device of an air conditioning unit according to some embodiments of the present disclosure. The device may be used to implement the method illustrated by FIG. 2. As shown in FIG. 6, the device includes: an acquisition module 60 configured to acquire a signal parameter of a current power line carrier channel between units in an air conditioning system, wherein the signal parameter is used for reflecting quality of the current power line carrier channel; a comparison module 62 configured to compare the signal parameter with a preset threshold value; a first determining module 64 configured to determine whether the current power line carrier channel is an available channel or not according to a result of the comparison.

It should be noted that, the modules shown in FIG. 6 may be implemented by software or hardware, and the latter case may be presented in the forms including, but are not limited to: the modules are respectively positioned in different processors; in some embodiments, the modules may be located in different processors in any combination.

It should be noted that, for alternative embodiments of the device shown in FIG. 6, reference may be made to the description related to the method shown in FIG. 2 and FIG. 5, while details are not repeated here.

Figure 7:
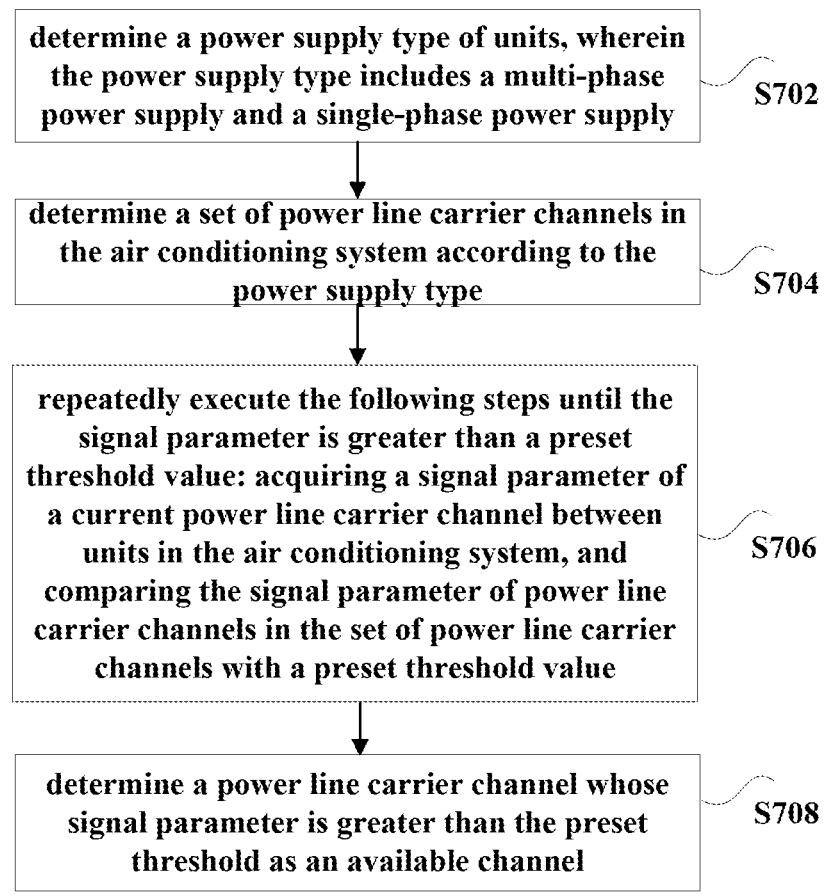
FIG. 7 is a flowchart of another communication implementation method of air conditioning units according to some embodiments of the disclosure.

FIG. 7 is a flowchart of another communication implementation method for air conditioning units according to some embodiments of the disclosure. As shown in FIG. 7, the method includes the following steps.

At step S702, a power supply type of units in an air conditioning system is determined, wherein the power supply type includes a multi-phase power supply and a single-phase power supply.

At step S704, a set of power line carrier channels in the air conditioning system is determined according to the power supply type.

At step S706, the following steps are repeatedly executed until the signal parameter is greater than a preset threshold value: acquiring a signal parameter of a current power line carrier channel between units in the air conditioning system, and comparing the signal parameter of power line carrier channels in the set of power line carrier channels with a preset threshold value.

At step S708, a power line carrier channel whose signal parameter is greater than the preset threshold is determined as an available channel.

It should be noted that, for alternative implementation of the method shown in FIG. 7, reference may be made to the description related to the method shown in FIG. 2 and FIG. 5, while details are not repeated here.

Figure 8:
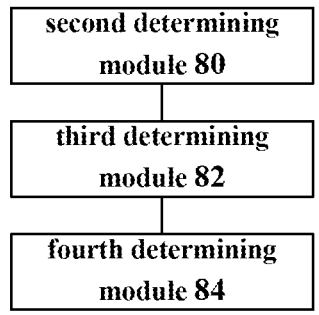
FIG. 8 is a block diagram of another communication implementation device of air conditioning units according to some embodiments of the present disclosure.

FIG. 8 is a structural block diagram of another communication implementation device of air conditioning units according to some embodiments of the disclosure. As shown in FIG. 8, the device includes: a second determining module 80 configured to determine a power supply type of units in an air conditioning system, wherein the power supply type comprises a multi-phase power supply and a single-phase power supply; a third determining module 82 configured to determine a set of power line carrier channels in the air conditioning system according to the power supply type; a fourth determining module 84 configured to repeatedly executing the following steps of acquiring a signal parameter of a current power line carrier channel between units in the air conditioning system, and comparing the signal parameter of power line carrier channels in the set of power line carrier channels with a preset threshold value, until the signal parameter is greater than a preset threshold value; and determine a power line carrier channel whose signal parameter is greater than the preset threshold as an available channel.

It should be noted that, the respective modules shown in FIG. 8 may be implemented by software or hardware, and the latter case may be presented in the forms including, but are not limited to: the modules are respectively positioned in different processors; in some embodiments, the modules may be located in different processors in any combination.

It should be noted that, for some alternative embodiments of the device shown in FIG. 8, reference may be made to the description related to the method shown in FIG. 2 and FIG. 5, while details are not repeated here.

The embodiments of the present disclosure also provide a storage medium comprising a stored program which, when executed, controls a device where the storage medium is located to execute any of the aforementioned communication implementation methods of the air conditioning unit.

The embodiments of the disclosure also provide a processor, which is used for running a program which, when being run, execute any of the aforementioned the communication implementation methods of the air conditioning unit.

The above-mentioned serial numbers of the embodiments of the present disclosure are only for description, and do not represent the advantages and disadvantages of the embodiments.

In the above embodiments of the present disclosure, the description of each embodiment has its own emphasis, and reference may be made to the related description of other embodiments for parts that are not described in detail in a certain embodiment.

In the embodiments provided in the present disclosure, it should be understood that the disclosed technical content can be implemented in other manners. The above-described apparatus embodiments are merely illustrative, and for example, the division of the units may be a logical division, and in actual implementation, there may be another division, for example, multiple units or components may be combined or may be integrated into another system, or some features may be omitted, or may not be executed. In addition, the shown or discussed coupling or direct coupling or communication connection between each other may be an indirect coupling or communication connection through some interfaces, units or modules, and may be electrical or in other forms.

The units described as separate parts may or may not be physically separate, and parts displayed as units may or may not be physical units, may be located in one position, or may be distributed on a plurality of units. Some or all of the units can be selected according to actual needs to achieve the purpose of the solution of the embodiment.

In addition, functional units in the embodiments of the present disclosure may be integrated into one processing unit, or each unit may exist alone physically, or two or more units are integrated into one unit. The integrated unit may be implemented in the form of hardware, or may also be implemented in the form of a software functional unit.

The integrated unit, if implemented in the form of a software functional unit and sold or used as a stand-alone product, may be stored in a computer readable storage medium. Based on such understanding, the technical solution of the present disclosure, which is substantially or partly contributed by the solutions known to the inventors, or all or part of the technical solution may be embodied in a software product, which is stored in a storage medium and includes instructions for causing a computer device (which may be a personal computer, a server, or a network device) to perform all or part of the steps of the method according to the embodiments of the present disclosure. And the aforementioned storage medium includes: a U-disk, a Read-Only Memory (ROM), a Random Access Memory (RAM), a removable hard disk, a magnetic disk, or an optical disk, and various media capable of storing program codes.

The foregoing are only exemplary embodiments of the present disclosure, and it should be noted that, for those skilled in the art, various modifications and amendments can be made without departing from the principle of the present disclosure, and these modifications and amendments should also be considered as the protection scope of the present disclosure.

INDUSTRIAL APPLICABILITY

The scheme provided by the embodiments of the disclosure can be applied to the communication field of air conditioning units. In some embodiments of the disclosure, communication between units is implemented through power line carrier channels in a manner of comparing the signal parameter of the current power line carrier channel is compared with a preset threshold value and determining an available channel according to the result of comparison, which solves the technical problems of high engineering installation cost and difficulty, poor contact of the communication line and difficulty of troubleshooting caused by the fact that the air conditioning units are connected through the communication line.

What is claimed is:
1. A communication implementation method of air conditioning units, comprising:
  acquiring a channel state of a current power line carrier channel between units in an air conditioning system, comprising:

acquiring a signal parameter for reflecting channel quality of the current power line carrier channel of the current power line carrier channel; and determining whether to switch the current power line carrier channel between the units to a next power line carrier channel which is any power line carrier channel except the current power line carrier channel in the air conditioning system according to the channel state, comprising:

comparing the signal parameter with a preset threshold value; and determining whether to switch the current power line carrier channel between the units to the next power line carrier channel according to a result of comparison.

2. The method of claim 1, wherein the determining whether to switch the current power line carrier channel between the units to the next power line carrier channel according to the result of the comparison comprises:

determining the current power line carrier channel as an unavailable channel and triggering to switch the current power line carrier channel between the units to the next power line carrier channel when the signal parameter is less than the preset threshold value; and determining the current power line carrier channel as an available channel and refusing to switch the current power line carrier channel between the units to the next power line carrier channel when the signal parameter is greater than the preset threshold value.

3. The method of claim 1, wherein the next power line carrier channel is determined by:

determining a power supply type of the units, wherein the power supply type comprises a multi-phase power supply and a single-phase power supply;

determining a set of power line carrier channels in the air conditioning system according to the power supply type; and selecting the next power line carrier channel from the set of power line carrier channels.

4. The method of claim 3, wherein the determining the set of power line carrier channels in the air conditioning system according to the power supply type comprises:

determining each of elements in the set of power line carrier channels according to a combination of any two of a live wire, a zero wire and a first designated line connected with the units when the power supply type is the single-phase power supply, wherein the first designated line is any communication passage except the live wire and the zero wire between the units of the air conditioning system;

determining each of the elements in the set of power line carrier channels according to a combination of any two of a plurality of live wires, a zero wire and a second designated line in the multi-phase power supply connected with the units when the power supply type is the multi-phase power supply, wherein the second designated line is any communication passage except the live wires and the zero wire between the units of the air conditioning system.

5. The method of claim 4, wherein at least one of the first designated line or the second designated line is: a refrigerant pipe or a ground wire used for connecting different units in the air conditioning system.

6. The method of claim 4, wherein the power type is determined to be the single-phase power supply if:

the power supply connected with the units is the single-phase power supply; or the power supply connected with the units is a three-phase power supply, and the units only support the single-phase power supply.

7. The method of claim 2, further comprising:

detecting a transmission time length which is a time length from a starting time that the current power line carrier channel starts to transmit a signal to a current time of the current power line carrier channel; and triggering the switching the current power line carrier channel between the units to the next power line carrier channel when the transmission time length is greater than a preset time length.

8. A non-transitory computer readable storage medium comprising a stored program which, when executed, controls a device where the storage medium is located to execute the communication implementation method of air conditioning units according to claim 1.

9. A communication implementation device of air conditioning units, comprising:

an acquisition module configured for: acquiring a channel state of a current power line carrier channel between units in an air conditioning system, comprising acquiring a signal parameter for reflecting channel quality of the current power line carrier channel of the current power line carrier channel;

a comparison module configured to compare the signal parameter with a preset threshold value; and a first determining module configured for: determining whether to switch the current power line carrier channel between the units to a next power line carrier channel which is any power line carrier channel except the current power line carrier channel in the air conditioning system according to the channel state, comprising determining whether to switch the current power line carrier channel between the units to the next power line carrier channel according to a result of comparison.

10. A processor configured to run a program which, when executed, performs the communication implementation method for performing instructions comprising:

acquiring a channel state of a current power line carrier channel between units in an air conditioning system, comprising:

acquiring a signal parameter for reflecting channel quality of the current power line carrier channel of the current power line carrier channel; and;

determining whether to switch the current power line carrier channel between the units to a next power line carrier channel which is any power line carrier channel except the current power line carrier channel in the air conditioning system according to the channel state, comprising:

comparing the signal parameter with a preset threshold value; and determining whether to switch the current power line carrier channel between the units to the next power line carrier channel according to a result of comparison.

11. An air conditioning system, comprising:

a controller;

an indoor unit; and an outdoor unit comprising the processor of claim 10.

12. The air conditioning system of claim 11, wherein:

the acquiring the channel state of the current power line carrier channel between units in an air conditioning system comprises: acquiring a signal parameter for reflecting channel quality of the current power line carrier channel of the current power line carrier channel; and the determining whether to switch the current power line carrier channel between the units to the next power line carrier channel according to the channel state comprises:

comparing the signal parameter with a preset threshold value; and determining whether to switch the current power line carrier channel between the units to the next power line carrier channel according to a result of the comparison.

13. The air conditioning system of claim 12, wherein the determining whether to switch the current power line carrier channel between the units to the next power line carrier channel according to the result of the comparison comprises:

determining the current power line carrier channel as an unavailable channel and triggering to switch the current power line carrier channel between the units to the next power line carrier channel when the signal parameter is less than the preset threshold value; and determining the current power line carrier channel as an available channel and refusing to switch the current power line carrier channel between the units to the next power line carrier channel when the signal parameter is greater than the preset threshold value.

14. The air conditioning system of claim 11, wherein the next power line carrier channel is determined by:

determining a power supply type of the units, wherein the power supply type comprises a multi-phase power supply and a single-phase power supply;

determining a set of power line carrier channels in the air conditioning system according to the power supply type; and selecting the next power line carrier channel from the set of power line carrier channels.

15. The air conditioning system of claim 14, wherein the determining the set of power line carrier channels in the air conditioning system according to the power supply type comprises:

determining each of elements in the set of power line carrier channels according to a combination of any two of a live wire, a zero wire and a first designated line connected with the units when the power supply type is the single-phase power supply, wherein the first designated line is any communication passage except the live wire and the zero wire between the units of the air conditioning system;

determining each of the elements in the set of power line carrier channels according to a combination of any two of a plurality of live wires, a zero wire and a second designated line in the multi-phase power supply connected with the units when the power supply type is the multi-phase power supply, wherein the second designated line is any communication passage except the live wires and the zero wire between the units of the air conditioning system.

16. The air conditioning system of claim 15, wherein at least one of the first designated line or the second designated line is: a refrigerant pipe or a ground wire used for connecting different units in the air conditioning system.

17. The air conditioning system of claim 15, wherein the power type is determined to be the single-phase power supply if:

the power supply connected with the units is the single-phase power supply; or the power supply connected with the units is a three-phase power supply, and the units only support the single-phase power supply.

18. The air conditioning system of claim 13, wherein the instructions further comprise:

detecting a transmission time length which is a time length from a starting time that the current power line carrier channel starts to transmit a signal to a current time of the current power line carrier channel; and triggering the switching the current power line carrier channel between the units to the next power line carrier channel when the transmission time length is greater than a preset time length.

19. The system of claim 11, wherein the controller comprises:

at least one of temperature controllers; and an centralized controller.

* * * * *